US011947030B2

(12) United States Patent
Que et al.

(10) Patent No.: US 11,947,030 B2
(45) Date of Patent: Apr. 2, 2024

(54) SYNCHRONIZED RADAR NETWORKS

(71) Applicant: Airbus Defence and Space GmbH, Taufkirchen (DE)

(72) Inventors: Russel Que, Hoehenkirchen-Siegertsbrunn (DE); Klaus Kittmann, Kirchseeon (DE); Michael Von Voithenberg, Munich (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 705 days.

(21) Appl. No.: 17/057,319

(22) PCT Filed: May 22, 2019

(86) PCT No.: PCT/EP2019/063220
§ 371 (c)(1),
(2) Date: Nov. 20, 2020

(87) PCT Pub. No.: WO2019/224251
PCT Pub. Date: Nov. 28, 2019

(65) Prior Publication Data
US 2021/0199753 A1   Jul. 1, 2021

(30) Foreign Application Priority Data
May 25, 2018  (EP) ..................... 18174378

(51) Int. Cl.
*G01S 7/02*  (2006.01)
*G01S 7/00*  (2006.01)
(Continued)

(52) U.S. Cl.
CPC .............. *G01S 7/023* (2013.01); *G01S 7/003* (2013.01); *G01S 7/0232* (2021.05);
(Continued)

(58) Field of Classification Search
CPC ........ G01S 7/023; G01S 7/0234; G01S 7/003; G01S 13/34; G01S 13/87; G01S 13/878;
(Continued)

(56) References Cited

U.S. PATENT DOCUMENTS

2005/0206554 A1   9/2005  Yamaura
2006/0258296 A1  11/2006  Steer et al.
(Continued)

FOREIGN PATENT DOCUMENTS

CN       104023403 A    9/2014
EP        2546674 A1    1/2013
(Continued)

OTHER PUBLICATIONS

International Search Report; priority document.
(Continued)

*Primary Examiner* — Peter M Bythrow
(74) *Attorney, Agent, or Firm* — Greer, Burns & Crain, Ltd.

(57) ABSTRACT

A radar system for providing position information to a mobile unit is provided. The radar system comprises a receiving interface. The receiving interface is adapted to receive radio frequency, RF, signals. The radar system further comprises a processing unit. The processing unit is adapted to process the received RF signals. The processing unit is adapted to determine an occupation of a predetermined time-frequency space by the received RF signals. The radar system further comprises a transmitting interface which adapted to transmit information on an intention of the radar system to occupy a specific portion of the predetermined time-frequency space. The radar system further comprises a plurality of beacon units. The beacon units are adapted to provide position information of the radar system on the specific portion in the predetermined time-frequency (Continued)

space, when it is determined that the specific portion of the predetermined time-frequency space is not occupied.

13 Claims, 6 Drawing Sheets

(51) Int. Cl.
    *G01S 13/87*     (2006.01)
    *H04W 56/00*     (2009.01)

(52) U.S. Cl.
    CPC ............ *G01S 7/0234* (2021.05); *G01S 13/87* (2013.01); *H04W 56/001* (2013.01)

(58) Field of Classification Search
    CPC ............ G01S 13/913; G01S 2013/466; H04W 56/001
    See application file for complete search history.

(56) References Cited

U.S. PATENT DOCUMENTS

| | | | |
|---|---|---|---|
| 2008/0204322 A1 | 8/2008 | Oswald et al. | |
| 2014/0247184 A1* | 9/2014 | Wendel | G01S 19/15 342/463 |
| 2015/0130656 A1* | 5/2015 | Marr | G01S 13/006 342/165 |
| 2015/0378004 A1* | 12/2015 | Wilson-Langman | G01S 7/003 342/52 |
| 2016/0124075 A1* | 5/2016 | Vogt | G01S 13/536 342/13 |
| 2016/0349354 A1 | 12/2016 | Yomo et al. | |
| 2017/0150368 A1 | 5/2017 | Ngo et al. | |
| 2017/0208474 A1* | 7/2017 | Mody | G01S 7/003 |
| 2017/0261596 A1* | 9/2017 | Lim | H04J 13/16 |
| 2017/0329449 A1 | 11/2017 | Silverstein et al. | |
| 2018/0199377 A1* | 7/2018 | Sanderovich | G01S 7/023 |

FOREIGN PATENT DOCUMENTS

| | | |
|---|---|---|
| JP | 2005223865 A | 8/2005 |
| JP | 2007518968 A | 7/2007 |
| JP | 2008210256 A | 9/2008 |
| JP | 2017161430 A | 9/2017 |
| WO | 2012023087 A1 | 2/2012 |
| WO | 2017149526 A2 | 9/2017 |
| WO | 2017207041 A1 | 12/2017 |

OTHER PUBLICATIONS

European Search Report; priority document.
Timoshenko et al., "Synchronization and Performance of MANET-based Obstacle Detection Systems" 2017 IEEE Conference of Russian Young Researchers in Electrical and Electronic Engineering (EICONRUS), Feb. 1, 2017, pp. 231-234.

* cited by examiner

SYNCHRONIZED RADAR NETWORKS

CROSS-REFERENCES TO RELATED APPLICATIONS

This application claims the benefit of the International Application No. PCT/EP2019/063220, filed on May 22, 2019, and of the European patent application No. 18174378.2 filed on May 25, 2018, the entire disclosures of which are incorporated herein by way of reference.

FIELD OF THE INVENTION

Examples relate to concepts for synchronizing radar networks and applications thereof and, in particular, to a radar network, a system of radar networks and a method for synchronizing radar networks.

BACKGROUND OF THE INVENTION

Most available systems for localization, such as radar systems, suffer from interference by another radar system of a same type, when operated side by side. They must be pre-planned and manually configured in order to work properly together. This is disadvantageous in highly mobile systems such as ships or formation flying where radar systems can encounter and disrupt each other in the field.

Thus, there may be a demand to provide concepts for operating local positioning systems of a same type ad hoc side by side.

SUMMARY OF THE INVENTION

According to a first aspect, a (for example ad hoc) radar system for providing position (and for example movement) information to a mobile unit is provided. The radar system comprises a receiving interface. The receiving interface is adapted (configured) to receive radio frequency, RF, signals. The radar system further comprises a processing unit. The processing unit is adapted to process the received RF signals. The processing unit is adapted to determine an occupation of a predetermined time-frequency space by the received RF signals. The radar system further comprises a transmitting interface. The transmitting interface is adapted to transmit information on an intention of the radar system to occupy a specific portion of the predetermined time-frequency space. The radar system further comprises a plurality of beacon units. The beacon units are adapted to provide position information of the radar system on the specific portion in the predetermined time-frequency space, when it is determined that the specific portion of the predetermined time-frequency space is not occupied.

For example, each radar system may be able for self-configuration in order to operate together with neighboring systems.

For example, this may allow multiple ship operation, where each ship with its own radar system can work in a same vicinity with other ships having another radar system without having to manually reconfigure an overlapping of measurement schemes.

For example, the plurality of beacon units is adapted to broadcast respective heartbeat signals. For example, the received RF signals further comprise heartbeat signals of at least one neighboring radar system. For example, the processing unit is adapted to (for example arbitrarily) adjust a repetition rate and/or time offset of the respective heartbeat signals of the plurality of beacon units to not overlap with the heartbeat signals of the at least one neighboring radar system.

Thus, synchronization may be improved by having less interference.

For example, the respective heartbeat signals broadcasted by the plurality of beacon units enable the at least one neighboring radar system to (for example arbitrarily) adjust the heartbeat signals of the at least one neighboring radar system.

The heartbeat signals of the at least one neighboring radar system may also be understood as the heartbeat signals broadcasted by another plurality of beacon units of the at least one neighboring radar system.

For example, the radar system is used on a moving platform, such as a landing deck for helicopters on a ship.

Thus, landing preciseness may be improved.

For example, the processing unit is electrically coupled to the receiving interface, the transmitting interface and each of the plurality of beacon units.

Thus, interference may be reduced in a communication within the radar system.

For example, the processing unit is wirelessly coupled to the receiving interface, the transmitting interface and each of the plurality of beacon units.

Thus, a distribution of radar system parts may be simplified.

For example, the wireless coupling is performed on a different frequency or in different frequency band than the heartbeat signal is broadcasted on.

Thus, interference may be avoided.

For example, providing position (and movement) information of the radar system comprises broadcasting measurement and communication signals.

The beacon unit may also be understood as transponder. The transponder may comprise the processing unit. The transponder may also comprise the receiving interface. The transponder may also comprise the transmitting interface. The transponder may also comprise the beacon unit. Thus, the transponder may be an entity comprising the beacon unit, the processing unit, the receiving interface and the transmitting interface.

The processing unit may be adapted to compute the frequency separation of the transmitted chirp signals and the received chirp signals from all the units at a particular time slot. The result of this processing may be transmitted as a data payload in the data communication wireless channel back to the other units or through a wired interface (e.g., the transponder can be connected via Ethernet cable).

Measurement signal in the context of this application may refer to the radar signal, e.g., chirp. Communication signal may refer to data being transmitted or broadcasted from one unit to another.

The beacon units of the plurality of beacon units may be used not only as provider of heartbeat signals but also as provider of measurement and communication signals.

For example, the processing unit is adapted to change a repetition rate and/or time offset of respective heartbeat signals to be transmitted by the plurality of beacon units, when it is determined that the specific portion of the predetermined time-frequency space is occupied. For example, the plurality of beacon units is adapted to broadcast the respective heartbeat signals with the changed repetition rate and/or time offset.

Various radar systems may be synchronized in terms of time and frequency space.

The communication and measurement signals may include the position (and movement) information of the radar system for the mobile unit.

For example, the beacon units are arranged on a same level.

This may provide a reference level. The same level may be the moving platform.

For example, the transmitting interface and the receiving interface are combined in a transceiving interface (for example using only one (a same) transceiver).

Thereby, a complexity may be reduced.

For example, the beacon units of the plurality of beacon units are arranged in a square manner on a same level, and wherein closest neighboring beacon units of the plurality of beacon units are apart by at least 1 meter (or 2 meters or 3 meters or 4 meters or 5 meters).

The beacon units of the plurality of beacon units may be provided around a landing pad or on a landing pad. The beacon units of the plurality of beacon units may form an area or space for an aircraft to land inside the area or space.

The communication may be performed wirelessly or wired. Thus, the plurality of beacon units may be connected per wire or contactless (for example wirelessly). A distance between each beacon unit may be larger than 1 meter (or 2 meters or 3 meters or 4 meters or 5 meters). The distance between each beacon unit may be less than 30 meters (or 25 meters or 20 meters or 15 meters). The platform may be a plane or a square or a plane square.

For example, the radar system comprises a plurality of communication units. Each communication unit of the plurality of communication units may be connected to a respective one of the plurality of beacon units. The processing unit may be wirelessly or electrically coupled thereto and adapted to exchange the control signals via the communication units.

According to a second aspect, a method in a (for example ad hoc) radar system for providing position (and for example movement) information to a mobile unit is provided. The method comprises receiving, by a receiving interface, radio frequency, RF, signals. The method further comprises processing, by a processing unit, the received RF signals. The method further comprises determining, by the processing unit, an occupation of a predetermined time-frequency space by the received RF signals. The method further comprises transmitting, by a transmitting interface, information on an intention of the radar system to occupy a specific portion of the predetermined time-frequency space. The method further comprises providing, by a plurality of beacon units, position information of the radar system on the specific portion in the predetermined time-frequency space, when it is determined that the specific portion of the predetermined time-frequency space is not occupied.

It is clear to a person skilled in the art that the statements set forth herein under use of hardware circuits, software means or a combination thereof may be implemented. The software means can be related to programmed microprocessors or a general computer, an ASIC (Application Specific Integrated Circuit) and/or DSPs (Digital Signal Processors). For example, the processing unit may be implemented partially as a computer, a logical circuit, an FPGA (Field Programmable Gate Array), a processor (for example, a microprocessor, microcontroller (µC) or an array processor)/a core/a CPU (Central Processing Unit), an FPU (Floating Point Unit), NPU (Numeric Processing Unit), an ALU (Arithmetic Logical Unit), a Coprocessor (further microprocessor for supporting a main processor (CPU)), a GPGPU (General Purpose Computation on Graphics Processing Unit), a multi-core processor (for parallel computing, such as simultaneously performing arithmetic operations on multiple main processor(s) and/or graphical processor(s)) or a DSP. It is further clear to the person skilled in the art that even if the herein-described details will be described in terms of a method, these details may also be implemented or realized in a suitable device, a computer processor or a memory connected to a processor, wherein the memory can be provided with one or more programs that perform the method, when executed by the processor. Therefore, methods like swapping and paging can be deployed.

Even if some of the aspects described above have been described in reference to the method, these aspects may also apply to the radar system. Likewise, the aspects described above in relation to the radar system may be applicable in a corresponding manner to the method.

It is also to be understood that the terms used herein are for purpose of describing individual embodiments and are not intended to be limiting. Unless otherwise defined, all technical and scientific terms used herein have the meaning which corresponds to the general understanding of the skilled person in the relevant technical field of the present disclosure; they are to be understood too neither too far nor too narrow. If technical terms are used incorrectly in the present disclosure, and thus do not reflect the technical concept of the present disclosure, these should be replaced by technical terms which convey a correct understanding to the skilled person in the relevant technical field of the present disclosure. The general terms used herein are to be construed based on the definition in the lexicon or the context. A too narrow interpretation should be avoided.

It is to be understood that terms such as, e.g., "comprising" "including" or "having" etc. mean the presence of the described features, numbers, operations, acts, components, parts, or combinations thereof, and do not exclude the presence or possible addition of one or more further features, numbers, operations, acts, components, parts or their combinations.

Although terms like "first" or "second" etc. may be used to describe different components or features, these components or features are not to be limited to these terms. With the above terms, only one component is to be distinguished from the other. For example, a first component may be referred to as a second component without departing from the scope of the present disclosure; and a second component may also be referred to as a first component. The term "and/or" includes both combinations of the plurality of related features, as well as any feature of that plurality of the described plurality of features.

In the present case, if a component is "connected to", "in communication with" or "accesses" another component, this may mean that it is directly connected to or directly accesses the other component; however, it should be noted that another component may be therebetween. If, on the other hand, a component is "directly connected" to another component or "directly accesses" the other component, it is to be understood that no further components are present therebetween.

In the following, the preferred embodiments of the present disclosure will be described with reference to the accompanying drawings; the same components are always provided with the same reference symbols.

In the description of the present disclosure, detailed explanations of known connected functions or constructions are omitted, insofar as they are unnecessarily distracting from the present disclosure; such functions and constructions are, however, understandable to the skilled person in the technical field of the present disclosure. The accompanying drawings are illustrative of the present disclosure and are not to be construed as a limitation. The technical idea of the present disclosure is to be construed as comprising, in addition to the accompanying drawings, all such modifications, variations and variants.

BRIEF DESCRIPTION OF THE DRAWINGS

Other objects, features, advantages and applications will become apparent from the following description of non-limiting embodiments regarding the accompanying drawings. In the drawings, all described and/or illustrated features, alone or in any combination form the subject matter disclosed therein, irrespective of their grouping in the claims or their relations/references. The dimensions and proportions of components or parts shown in the figures are not necessarily to scale; these dimensions and proportions may differ from illustrations in the figures and implemented embodiments.

DETAILED DESCRIPTION OF THE PREFERRED EMBODIMENTS

Figure 1:
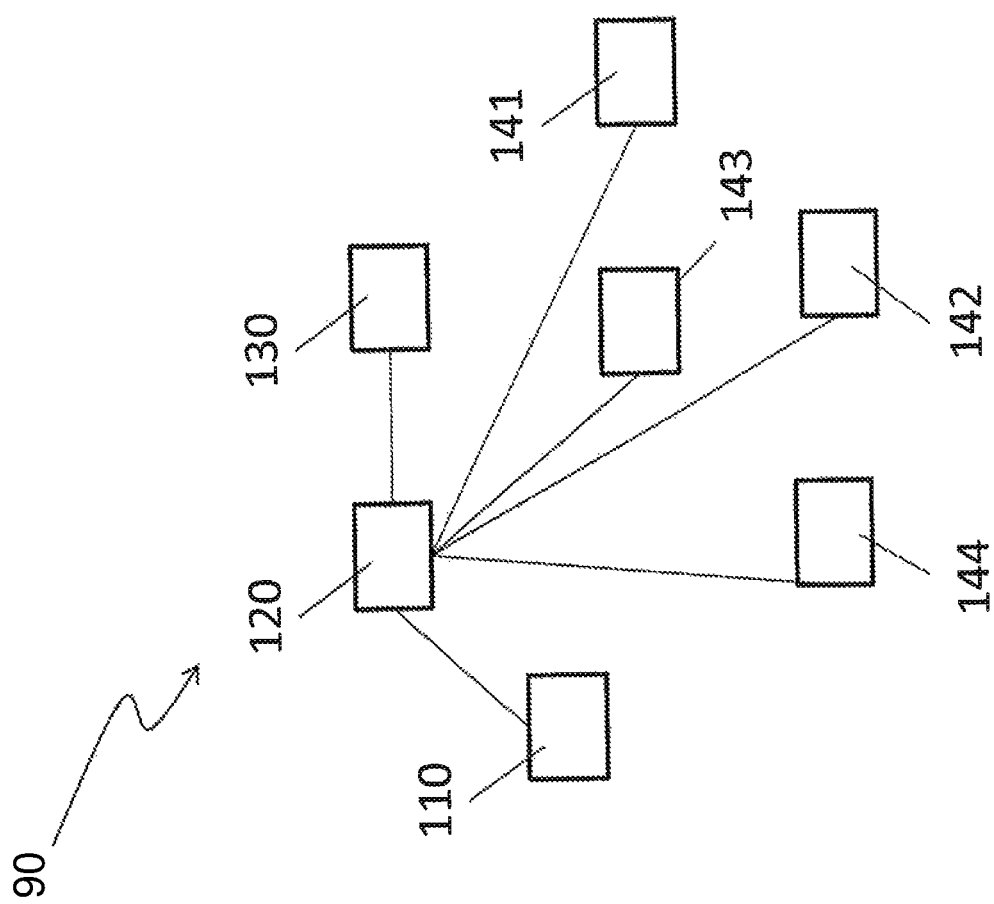
FIG. 1 schematically illustrates a radar system for providing position information to a mobile unit.

The variants of the functional and operational aspects as well as their functional and operational aspects described herein are only for a better understanding of its structure, its functions and properties; they do not limit the disclosure to the embodiments. The figures are partially schematic, the essential properties and effects are clearly shown enlarged or scaled down in part to clarify the functions, active principles, embodiments and technical characteristics. Every operation, every principle, every technical aspect and every feature that/which is disclosed in the figures or in the text is/can be combined with all claims, each feature in the text and the other figures, other modes of operation, principles, technical refinements and features that are included in this disclosure, or result from it, so that all possible combinations are assigned to the devices and methods described. They also include combinations of all individual comments in the text, that is, in each section of the description, in the claims and combinations between different variations in the text, in the claims and in the figures, and can be made to subject-matter of further claims. The claims do not limit the disclosure and therefore the possible combinations of all identified characteristics among themselves. All features disclosed are explicitly also individually and in combination with all other features disclosed herein.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e., only A, only B as well as A and B. An alternative wording for the same combinations is "at least one of A and B". The same applies for combinations of more than 2 elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

The radar system and the method will now be described with respect to the embodiments.

In the following, without being restricted thereto, specific details are set forth to provide a thorough understanding of the present disclosure. However, it is clear to the skilled person that the present disclosure may be used in other embodiments, which may differ from the details set out below.

FIG. 1 schematically illustrates a (ad hoc) radar system (90) for providing position (and movement) information to a mobile unit. The radar system (90) comprises a receiving interface (110). The receiving interface (110) is adapted to receive radio frequency, RF, signals. The radar system (90) further comprises a processing unit (120). The processing unit (120) is adapted to process the received RF signals. The processing unit (120) is adapted to determine an occupation of a predetermined time-frequency space by the received RF signals. The radar system (90) further comprises a transmitting interface (130). The transmitting interface (130) is adapted to transmit information on an intention of the radar system (90) to occupy a specific portion of the predetermined time-frequency space. The radar system (90) further comprises a plurality of beacon units (141, 142, 143, 144). The beacon units (141, 142, 143, 144) are adapted to provide position information of the radar system (90) on the specific portion in the predetermined time-frequency space, when it is determined that the specific portion of the predetermined time-frequency space is not occupied.

For example, each radar system may be able for self-configuration in order to operate together with neighboring systems. For example, this may allow multiple ship operation, where each ship with its own radar system can work in a same vicinity with other ships having another radar system without having to manually reconfigure an overlapping of measurement schemes.

For example, the plurality of beacon units (141, 142, 143, 144) is adapted to broadcast respective heartbeat signals. For example, the received RF signals further comprise heartbeat signals of at least one neighboring radar system. For example, the processing unit (120) is adapted to (arbitrarily) adjust a repetition rate and/or time offset of the respective heartbeat signals of the plurality of beacon units (141, 142, 143, 144) to not overlap with the heartbeat signals of the at least one neighboring radar system.

Thus, synchronization may be improved by having less interference.

For example, the respective heartbeat signals broadcasted by the plurality of beacon units (141, 142, 143, 144) enable the at least one neighboring radar system to (arbitrarily) adjust the heartbeat signals of the at least one neighboring radar system.

The heartbeat signals of the at least one neighboring radar system may also be understood as the heartbeat signals broadcasted by another plurality of beacon units of the at least one neighboring radar system.

For example, the radar system (90) is used on a moving platform, such as a landing deck for helicopters on a ship.

Thus, landing preciseness may be improved.

For example, the processing unit (120) is electrically coupled to the receiving interface (110), the transmitting interface (130) and each of the plurality of beacon units (141, 142, 143, 144).

Thus, interference may be reduced in a communication within the radar system.

For example, the processing unit (120) is wirelessly coupled to the receiving interface (110), the transmitting interface (130) and each of the plurality of beacon units (141, 142, 143, 144).

Thus, a distribution of radar system parts may be simplified.

For example, the wireless coupling is performed on a different frequency or in different frequency band than the heartbeat signal is broadcasted on.

Thus, interference may be avoided.

For example, providing position (and movement) information of the radar system (90) comprises broadcasting measurement and communication signals.

The beacon units (141, 142, 143, 144) of the plurality of beacon units (141, 142, 143, 144) may be used not only as provider of heartbeat signals but also as provider of measurement and communication signals.

For example, the processing unit (120) is adapted to change a repetition rate and/or time offset of respective heartbeat signals to be transmitted by the plurality of beacon units (141, 142, 143, 144), when it is determined that the specific portion of the predetermined time-frequency space is occupied. For example, the plurality of beacon units (141, 142, 143, 144) is adapted to broadcast the respective heartbeat signals with the changed repetition rate and/or time offset.

Various radar systems may be synchronized in terms of time and frequency space.

The communication and measurement signals may include the position (and movement) information of the radar system (90) for the mobile unit.

For example, the beacon units (141, 142, 143, 144) are arranged on a same level.

This may provide a reference level. The same level may be the moving platform.

For example, the transmitting interface (130) and the receiving interface (110) are combined in a transceiving interface (using only one (a same) transceiver).

Thereby, a complexity may be reduced.

For example, the beacon units (141, 142, 143, 144) of the plurality of beacon units (141, 142, 143, 144) are arranged in a square manner on a same level, and wherein closest neighboring beacon units (141, 142, 143, 144) of the plurality of beacon units (141, 142, 143, 144) are apart by at least 1 meters.

The beacon units (141, 142, 143, 144) of the plurality of beacon units (141, 142, 143, 144) may be provided around a landing pad or on a landing pad. The beacon units (141, 142, 143, 144) of the plurality of beacon units (141, 142, 143, 144) may form an area or space for an aircraft to land inside the area or space.

The communication may be performed wirelessly or wired. Thus, the plurality of beacon units (141, 142, 143, 144) may be connected per wire or contactless (wirelessly). A distance between each beacon unit may be larger than 1 meter (or 2 meters or 3 meters or 4 meters or 5 meters). The distance between each beacon unit may be less than 30 meters (or 25 meters or 20 meters or 15 meters). The platform may be a plane or a square or a plane square.

For example, the radar system comprises a plurality of communication units (not shown). Each communication unit of the plurality of communication units may be connected to a respective one of the plurality of beacon units (141, 142, 143, 144). The processing unit (120) may be wirelessly or electrically coupled thereto and adapted to exchange the control signals via the communication units.

More details and aspects are mentioned in connection with the embodiments described above or below. The embodiment shown in FIG. 1 may comprise one or more optional additional features corresponding to one or more aspects mentioned in connection with the proposed concept or one or more embodiments described below (e.g., FIGS. 2-6).

Figure 2:
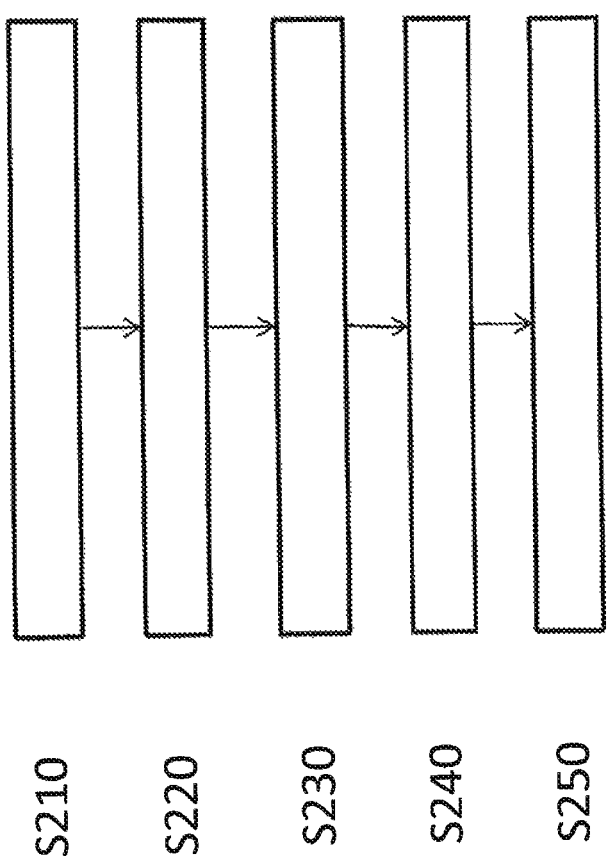
FIG. 2 schematically illustrates a method in a radar system for providing position information to a mobile unit.

FIG. 2 schematically illustrates a method in a (ad hoc) radar system for providing position (and movement) information to a mobile unit. The method comprises receiving (S210), by a receiving interface, radio frequency, RF, signals. The method further comprises processing (S220), by a processing unit, the received RF signals.

The method further comprises determining (S230), by the processing unit, an occupation of a predetermined time-frequency space by the received RF signals. The method further comprises transmitting (S240), by a transmitting interface, information on an intention of the radar system to occupy a specific portion of the predetermined time-frequency space. The method further comprises providing (S250), by a plurality of beacon units, position information of the radar system on the specific portion in the predetermined time-frequency space, when it is determined that the specific portion of the predetermined time-frequency space is not occupied.

More details and aspects are mentioned in connection with the embodiments described above or below. The embodiment shown in FIG. 2 may comprise one or more optional additional features corresponding to one or more aspects mentioned in connection with the proposed concept or one or more embodiments described above (e.g., FIG. 1) or below (e.g., FIGS. 3-6).

Figure 3:
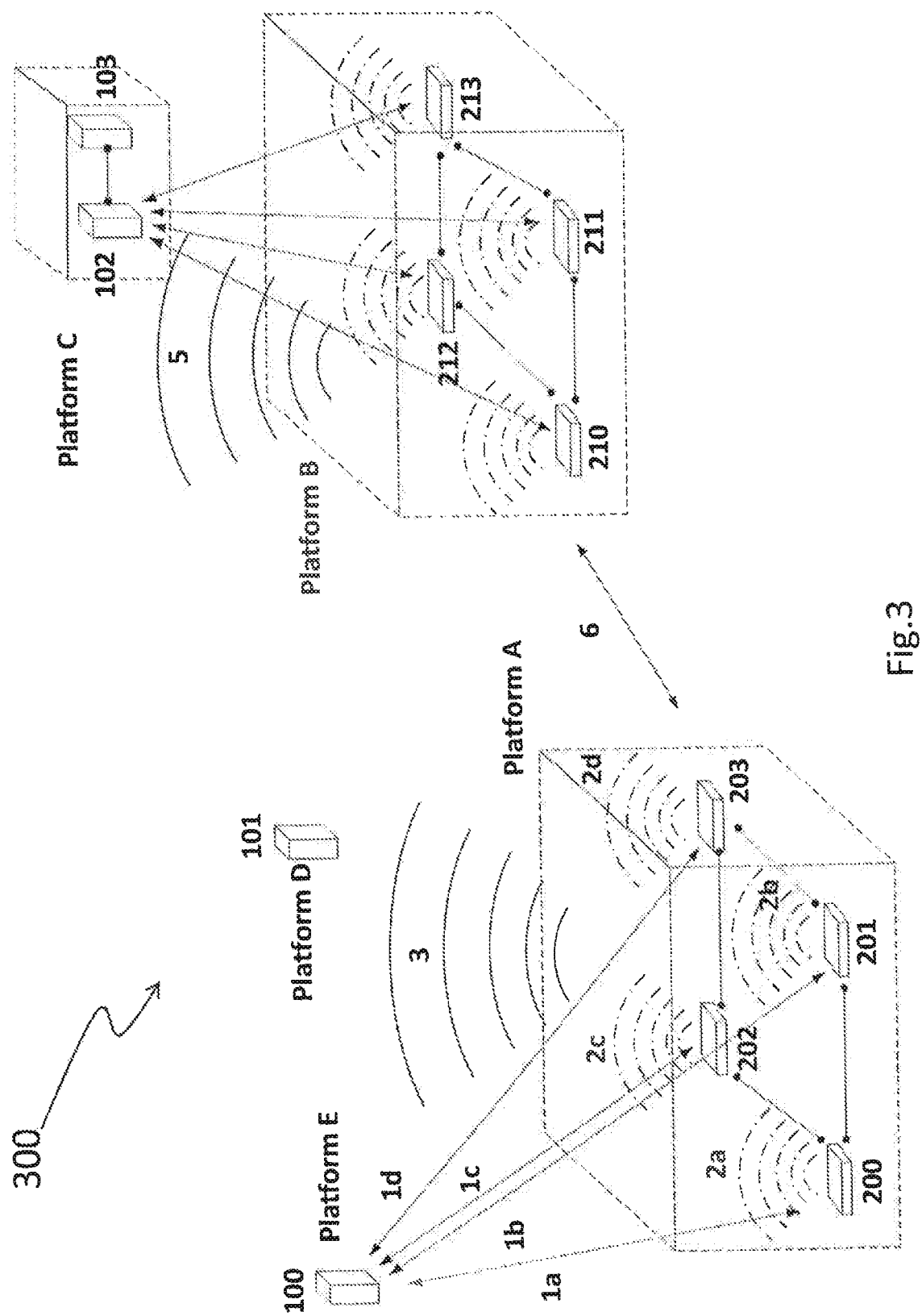
FIG. 3 schematically illustrates multiple radar networks for synchronization.

FIG. 3 schematically illustrates multiple radar networks for synchronization. A first radar network is positioned on a platform A. A second radar network is positioned on a platform B. Further, mobile units 100, 101, 102 and 103 are shown. The mobile unit 100 is mounted on a platform E. The mobile unit 101 is mounted on a platform D. The mobile units 102 and 103 are connected to each other and mounted on a platform C. The first radar network comprises a first plurality of radio beacons 200, 201, 202 and 203 mounted or fixed on mobile platform A (any number of radio beacons is imaginable). Radio beacons may also be referred herein as beacons or beacon units. The second radar network comprises a second plurality of radio beacons 210, 211, 212 and 213 mounted or fixed on mobile platform B.

In the scenario of FIG. 3, there may also be more platforms as shown herein. Each mobile platform may contain any number of client units that can be connected in a network. In this figure, there are shown different signals. The signals 3 and 5 are respective heartbeat (data) signals coming from the respective platforms A and B. The heartbeat (data) signals may be broadcasted from one or more beacon units of the respective first or second radar network. The broadcasting may be performed in any combination of sequential and/or simultaneous transmit mode. Further, the signals 1a, 1b, 1c and 1d are ranging signals between a client and beacons (for example between platform E with client 100 and a respective beacon 202). Further, the signals 2a, 2b, 2c and 2d are ranging and data signals that can be picked up by any other passive clients like number 101 on platform D. The ranging and data signals may allow the client(s) to compute its (their) position. Further, signal 6 is either a passive or handshake negotiation in order to adjust each radar system to non-conflicting time-frequency slots (portions) operations. Further, a wired interface can run through units (may connect any unit within one platform) in any topology in order to exchange data or synchronization. For example, the beacon units of each platform A and B may be connected by wire. Any unit of the radar network may therefore exchange data or ranging/syncing signals to another unit either through the wireless interface or wired interface. Thus, it can be ensured that if a unit is completely shadowed in radio frequency (RF) terms, that it can still be incorporated into the respective radar network's time-frequency slots using a wired interface.

More details and aspects are mentioned in connection with the embodiments described above or below. The embodiment shown in FIG. 3 may comprise one or more optional additional features corresponding to one or more aspects mentioned in connection with the proposed concept or one or more embodiments described above (e.g., FIG. 1-2) or below (e.g., FIGS. 4-6).

Figure 4:
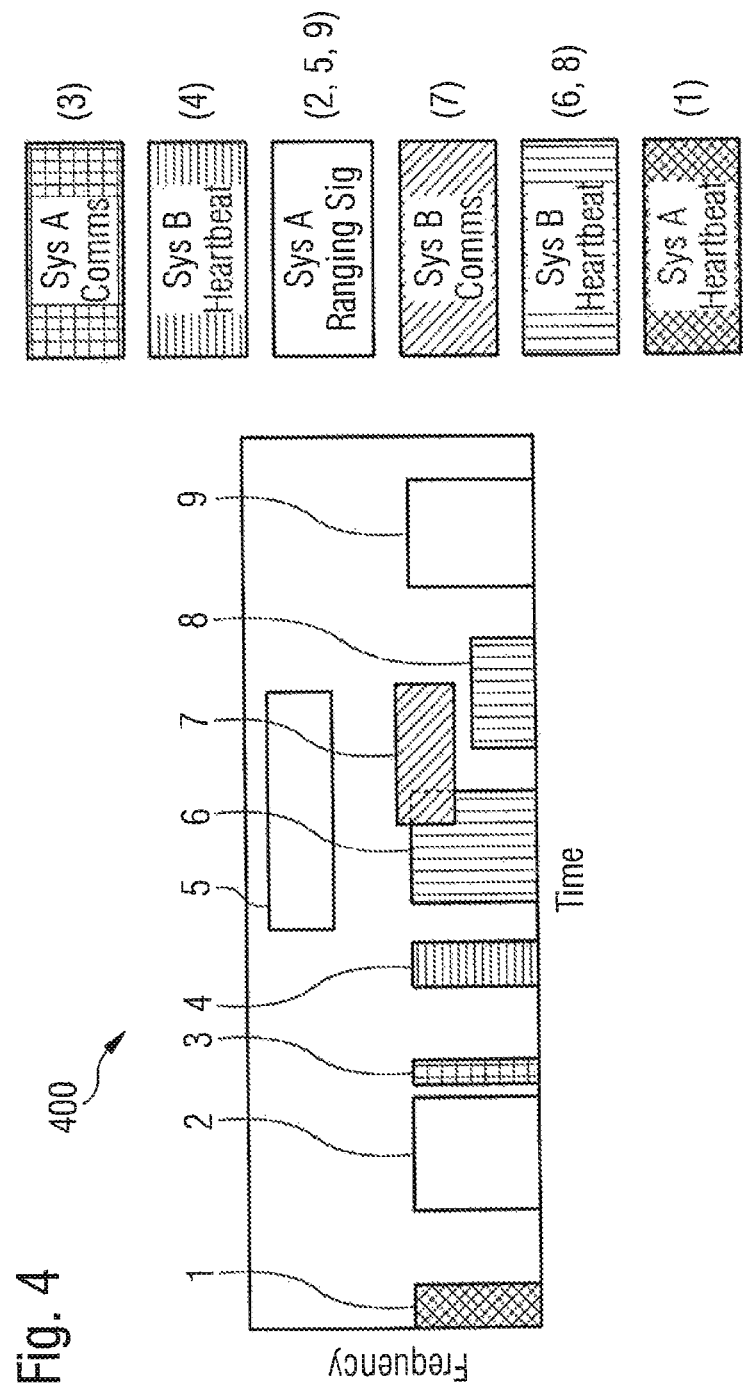
FIG. 4 schematically illustrates an allotment of a predetermined time-frequency space.

FIG. 4 schematically illustrates an allotment of a predetermined time-frequency space. Six different kinds of signals are shown in FIG. 4, however not restricted to six different kinds. The signals are referred to a respective platform A or B of FIG. 3. Thus, there are three different signals corresponding to platform A (Sys A Comms, Sys A Ranging Sig and Sys A Heartbeat) and three different signals corresponding to platform B (Sys B Heartbeat, Sys B Comms and Sys B Ranging). Sys A Comms (reference sign 3) and Sys B Comms (reference sign 7) are communication signals from the respective platforms A/B. Sys A Heartbeat (reference sign 1) and Sys B Heartbeat (reference sign 4) are heartbeat signals from the respective platforms A/B. Sys A Ranging Sig (reference signs 2, 5 and 9) and Sys B Ranging Sig (reference signs 6 and 8) are ranging signals from the respective platforms. Those signals may be allotted due to a synchronization phase and occupation intention of a respective radar network. Due to the radar networks' intentions to occupy a specific part of the time-frequency space such as in FIG. 4 shown, the different radar networks can be synchronized. Further, priorities may be handled due to a negotiation phase during allotment of the time-frequency space.

More details and aspects are mentioned in connection with the embodiments described above or below. The embodiment shown in FIG. 4 may comprise one or more optional additional features corresponding to one or more aspects mentioned in connection with the proposed concept or one or more embodiments described above (e.g., FIG. 1-3) or below (e.g., FIGS. 5-6).

Figure 5:
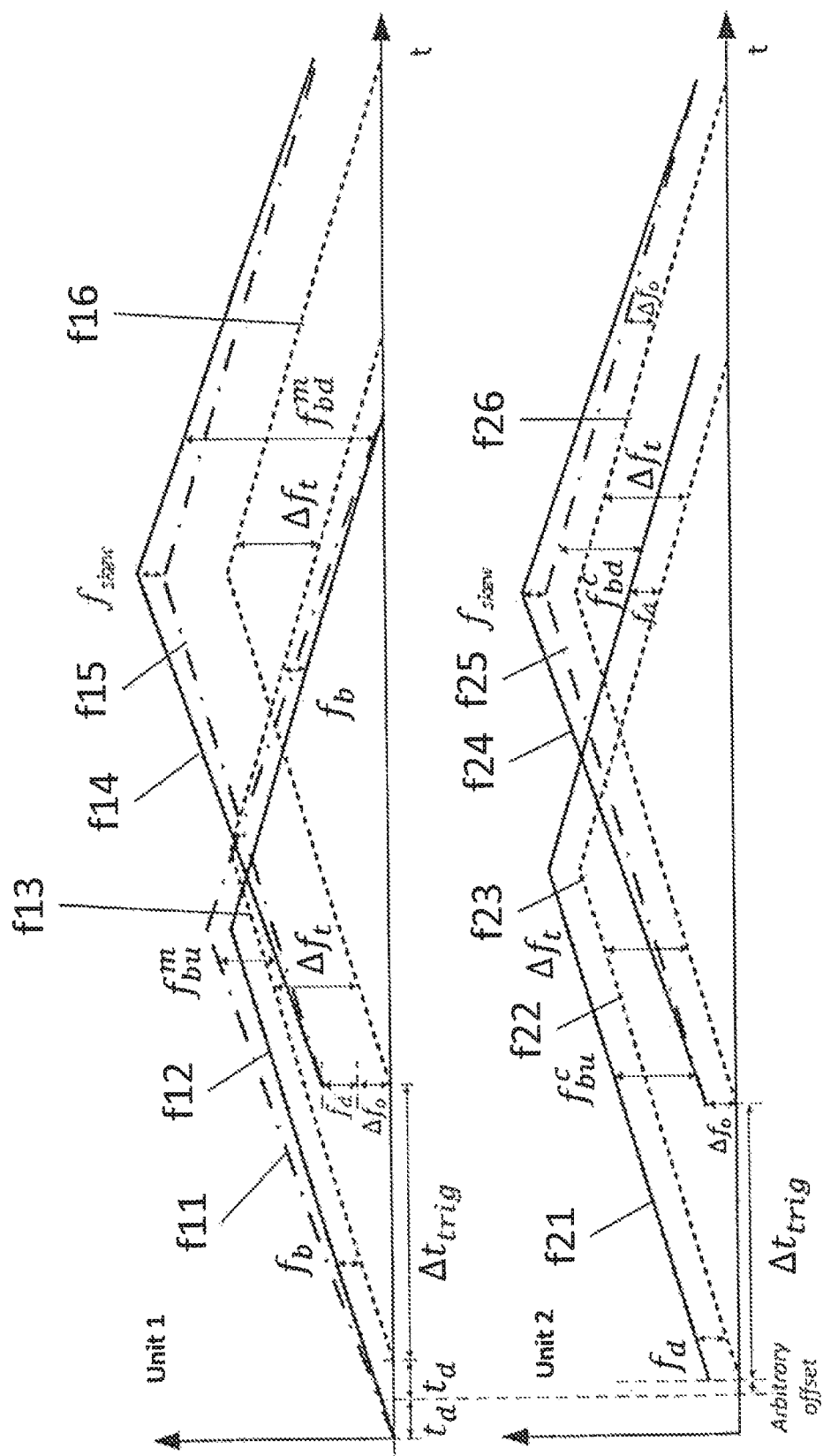
FIG. 5 schematically illustrates mismatched FMCW radar signals.

FIG. 5 schematically illustrates mismatched FMCW radar signals. A linear system of equations result in correction formulas. The respective parameters and variables are shown similar to a standard FMCW radar. Hereinafter, master may also refer to a beacon unit of a respective radar network, such as in FIG. 3. The same applies for the term "client", which may be a mobile unit separate from one of the platforms A or B, such as in FIG. 3. The following correction equations are used for correcting the artificial delays, the RF center frequency offset between transceivers and Doppler shift (and clock frequency offset correction):

$f_{bu,d}{}^{m,c}$=beat frequency of the detected peak at master ($m$) or client ($c$) during upsweep ($u$) or downsweep ($d$);

$f_{cNominal}$=the nominal RF center frequency;

$t_m, B, c$=sweep duration, RF bandwidth, speed of light;

$$f_{b,range} = \frac{(f_{bu}^m - f_{bu}^c) + (f_{bd}^m - f_{bd}^c)}{2} = \text{effective beat frequency of the range}$$

separation between master and client;

$$\Delta f_0 = \frac{1}{4}[(f_{bd}^m - f_{bu}^m) + (f_{bd}^c - f_{bu}^c)] = \text{the difference}$$

in frequency between the client's and master's RF oscillator;

$$f_d = \frac{1}{4}[(f_{bd}^m - f_{bu}^m) - (f_{bd}^c - f_{bu}^c)] = \text{the Doppler shift};$$

$$\text{range} = \frac{ct_m}{2B} f_{b,range} = \text{the distance in meters between master and client};$$

and velocity =

$$f_d \frac{c}{f_{cNominal}} = \text{the relative radial velocity between master and client}.$$

Further, an additional correction is implemented to correct the range dependent frequency offset in a deskewing step (see graph fskew).

More details and aspects are mentioned in connection with the embodiments described above or below. The embodiment shown in FIG. 5 may comprise one or more optional additional features corresponding to one or more aspects mentioned in connection with the proposed concept or one or more embodiments described above (e.g., FIG. 1-4) or below (e.g., FIG. 6).

Figure 6:
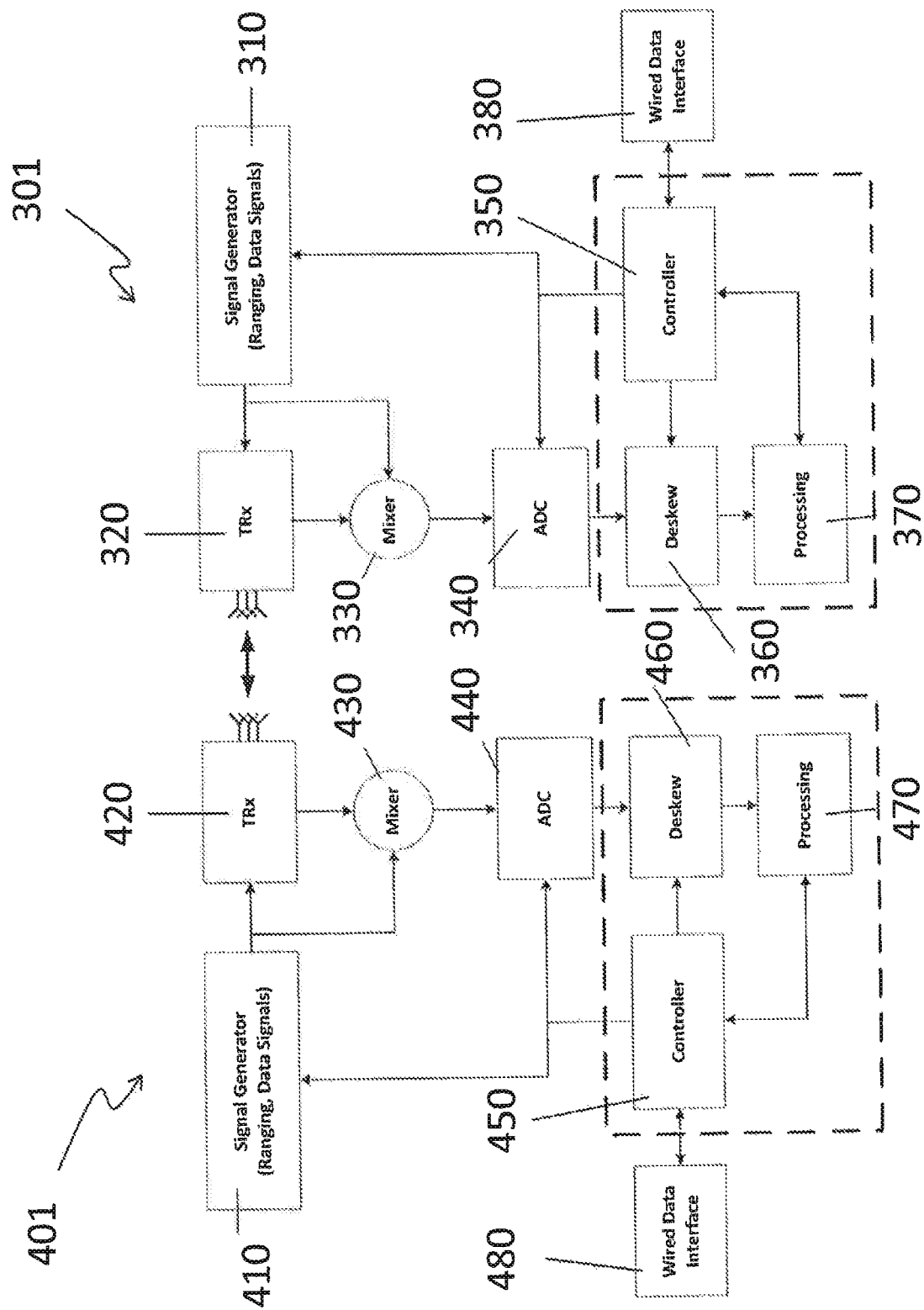
FIG. 6 schematically illustrates a block diagram of two radar units for distance measurement between each other.

FIG. 6 schematically illustrates a block diagram of two radar units 401 and 301 for distance measurement between each other. Specifically, both transceivers may be adapted to transmit data and ranging signals and not only ranging signals. FIG. 6 shows a first radar unit 401. The first radar unit may comprise a transceiver 420 (TRx) which may be adapted to transmit and receive signals from the second radar unit. More specifically, the transceiver 420 may be adapted to transmit data (via data link) and ranging signals. The first radar unit 401 further comprises a signal generator 410. The signal generator can be adapted to generate both ranging and data signals. Further the signal generator 410 may be adapted to feed the transceiver 420 with the (generated) data and ranging signals. The first radar unit 401 may further comprise a mixer 430. The mixer 430 may be adapted to downconvert a received signal into a baseband signal of interest by use of the signal fed by the signal generator 410 to the transceiver 420, which is also fed to the mixer 430 in order to downconvert the respectively received signal by the transceiver 420. The signal generator 410 may also provide another signal being a local oscillator, LO, signal, such that the respectively received signal is downconverted by the LO signal instead of the signal fed by the signal generator 410 to the transceiver 420. Further, the first radar unit 401 may comprise an analog-to-digital converter 440 (ADC) which is adapted to perform conversion of the received signal in the digital domain. Further, the first radar unit may comprise a controller 450. The controller 450 may be adapted to feed the ADC 440 and the signal generator 410 with respective control signals in order to perform their respective tasks. Further, the first radar unit 401 may comprise a deskewing unit 460 (Deskew). The deskewing unit 460 may be adapted to perform the additional step of deskewing, such that a range dependent frequency offset can be eliminated. The deskewing unit 460 may be fed by control signals of the controller 450 as well as the signal generator 410 and the transceiver 420. Further, the first radar unit 401 may comprise a processing unit 470. The processing unit 470 may be fed by the deskewing unit 460 and may be in communication with the controller 450. Further, the first radar unit 401 may comprise a wired data interface 480. The wired data interface 480 may be in communication with the controller 450. The controller 450 may be programmable via the wired data interface in order to perform the respective tasks and to provide respective control signals to the respective units. Further, the wired data interface 480 may be used to send data (from any of the block units) to a network of other units in the same platform (airborne or ground). The block units may not necessarily be discrete elements, but show just logical operations and control.

FIG. 6 shows a second radar unit 301. The second radar unit may comprise a transceiver 320 (TRx) which may be adapted to transmit and receive signals from the second radar unit. More specifically, the transceiver 320 may be adapted to transmit data (via data link) and ranging signals. The second radar unit 301 further comprises a signal generator 310. The signal generator can be adapted to generate both ranging and data signals. Further the signal generator 310 may be adapted to feed the transceiver 320 with the (generated) data and ranging signals. The second radar unit 301 may further comprise a mixer 330. The mixer 330 may be adapted to downconvert a received signal into a baseband signal of interest by use of the signal fed by the signal generator 310 to the transceiver 320, which is also fed to the mixer 330 in order to downconvert the respectively received signal by the transceiver 320. Further, the second radar unit 301 may comprise an analog-to-digital converter 340 (ADC) which is adapted to perform conversion of the received signal in the digital domain. Further, the second radar unit may comprise a controller 350. The controller 350 may be adapted to feed the ADC 340 and the signal generator 310 with respective control signals in order to perform their respective tasks. Further, the second radar unit 301 may comprise a deskewing unit 360 (Deskew). The deskewing unit 360 may be adapted to perform the additional step of deskewing, such that a range dependent frequency offset can be eliminated. The deskewing unit 360 may be fed by control signals of the controller 350 as well as the signal generator 310 and the transceiver 320. Further, the second radar unit 301 may comprise a processing unit 370. The processing unit 370 may be fed by the deskewing unit 360 and may be in communication with the controller 350. Further, the second radar unit 301 may comprise a wired data interface 380. The wired data interface 380 may be in communication with the controller 350. The controller 350 may be programmable via the wired data interface in order to perform the respective tasks and to provide respective control signals to the respective units. Further, the wired data interface 380 may be used to send data (from any of the block units) to a network of other units in the same platform (airborne or ground). The block units may not necessarily be discrete elements, but show just logical operations and control.

More details and aspects are mentioned in connection with the embodiments described above or below. The embodiment shown in FIG. 6 may comprise one or more optional additional features corresponding to one or more aspects mentioned in connection with the proposed concept or one or more embodiments described above (e.g., FIG. 1-5) or below.

Aspects may relate to Radar, Cooperative Radar, Two-way Ranging, Local Positioning System and Distance Measurement Devices.

Further aspects may relate to Manned or Unmanned Aerial Vehicle Landing System, Drone-Ship Landing System, Automotive or Aircraft Localization and Navigation, Indoor Localization, Gesture and Movement Tracking for Gaming or Augmented Reality, Robotics Control and Aircraft Formation Flying.

Aspects may relate to synchronized radar networks. For example, one or more ad hoc systems of radar networks are provided. The ad hoc systems may provide spatial/position information to any number of mobile units in a coverage area. The mobile units may be equipped with either receive mode only or cooperative mode Tx-Rx enabled RF front-ends. For example, each radar network transmits or broadcasts from one or more of its beacons a heartbeat/sync signal encoded with data information through a wired or wireless interface. Further, each radar network can contain one or more units capable of communicating with any unit in the same network either wired or wireless. Further, the repetition rate and time offset of the heartbeat signal can be arbitrary and adjusted to fit other heartbeat signals from neighboring systems in order to avoid collision of measurement and communication signals either in time or frequency domain. Further, each radar network may listen to the surrounding heartbeat signals and overall RF environment if a time-frequency space is occupied. Further, each radar network may broadcast its intention to occupy at least part of the time-frequency space. Further, each radar network may proceed to occupy the at least part of the time-frequency space when no conflicting intention is detected. Further, each radar network may then use its negotiated time-frequency space to put its measurement and communication signals to service. Specifically, to service its mobile clients with spatial and movement information (of the servicing radar network) as well as user data. Further, the radar network may align its heartbeat signals to be GPS trained. Further, priorities in the negotiation phase of time-frequency allotment can be put into a rule e.g., Emergency service like coast guard can enable higher priority codes. The higher the priority the higher may be a probability of being readily provided with (the requested at least part of the) time-frequency space and a high update rate. The lowest order priority may be more probable to be settled in the lowest update rate possible for minimum working operational condition.

Aspects may relate to a mismatched FMCW radar signal and use thereof. For example, at least two nodes may measure their distance to each other using mismatched frequency modulated radar signals in time offset, frequency offset, and/or sweep profile. The nodes may also be referred to as radar sensors. Radar Sensors may also be referred to as radar units. The sweep profiles can be linear ramps of different slopes. For example, each node may deskew a beat signal of the FMCW radar signal (sent by the respective other node), i.e., after the mixer, in order to match the incoming ramp profile. An extra correction on the normal distance computation may be added due to some range dependent frequency offset. The ramp mismatch can be different from pulse to pulse. The ramp mismatch can be different from measurement slot to measurement slot. This may provide some spoofing resiliency.

Aspects may relate to a device to do distance measurement to another device and as a radar backscatter sensor under one single measurement time slot. For example, two or more transceivers may send their wideband signals (e.g., chirp, ofdm, etc.) at separate time or frequency offset within the measurement slot. The term transceiver may be referred to the device for transceiving signals which may comprise a transceiver unit. Further, each transceiver may process an equivalent time or frequency deviation of its transmitted signal to the incoming signal (of the other transceiver(s)). For example, at least one, in any pair of two transceivers, may send the corresponding deviation to the other through a data link using the same transceiver unit. The transceiver may receive the deviation data and may compute the equivalent separation distance (between the two transceivers) by incorporating its own corresponding measurement of the time or frequency deviation. Independent of measuring the time or frequency deviation from the other transceiver(s) which is (are) mapped at certain time or frequency region(s) with enough offset away from the backscatter region of any transceiver(s), any transceiver may compute the backscatter region by sensing the environment using normal radar techniques. For example, the transceiver may be used as proximity sensor or as collision avoidance sensor.

In the embodiments, the ranging signals may be chirps. The data communication signals may have any kind of waveform, such as QAM, OFDM, etc., used for modulating data. Both may be used to compute the precise distance measurements or 'pseudoranges', between 100 and 200, 100 and 201, 100 and 202, 100 and 203. Based on these pseudoranges the relative 3D position (x, y, z) can be computed by 100 or by base radar system (200-203). The ranging signals 1a-1d may provide simply the pseudoranges.

In the embodiments, Chirp and data communication signals may both be needed to compute the pseudoranges. Units 100, 200-203 all specifically occupy their own regions in the beat frequency domain. For example, Unit 101, however, can opt to be passive only (Rx only). Nevertheless it may also be able to compute its 3D position provided the base radar system broadcast the absolute offsets of their ranging signal relative to each other. Unit 100 computes the 3D position using a search optimization algorithm using the computed pseudoranges 1a-1d. Unit 101 may need a different algorithm since it is not 'participating', therefore it may not be able to know its respective pseudoranges. It can only know arrival times of the ranging signals, therefore requiring the base radar system to send its relative offsets to each other via the data communication broadcast. Unit 101 may then proceed to compute the position and delay time, similar to how GPS receivers compute their position relative to GPS satellites. Thus, unit 100 may also actively send ranging and data signals but not unit 101.

In the embodiments, position information may be computed using information gathered from the ranging signal at both units 100 and 200 (for example, for one pseudorange).

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for pedagogical purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

The present disclosure is not limited in any way to the embodiments described above. On the contrary, there are many possibilities for modifications thereof, which are apparent to an average skilled person without departing from the underlying idea of the present disclosure as defined in the appended claims.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A radar system for providing position information to a mobile unit, the radar system comprising:
   a receiving interface which is adapted to receive radio frequency (RF) signals;
   a processing unit which is adapted to process received RF signals and to determine an occupation of a predetermined time-frequency space by the received RF signals;
   a transmitting interface adapted to transmit information on an intention of the radar system to occupy a specific portion of the predetermined time-frequency space; and
   a plurality of beacon units adapted to provide position information of the radar system on the specific portion in the predetermined time-frequency space, when it is determined that the specific portion of the predetermined time-frequency space is not occupied, and wherein
   the plurality of beacon units is adapted to transmit, on the specific portion in the predetermined time-frequency space, ranging signals based on which the mobile unit can compute its 3D position.

2. The radar system according to claim 1, wherein the plurality of beacon units is adapted to broadcast respective heartbeat signals;
   wherein the received RF signals further comprise heartbeat signals of at least one neighboring radar system; and
   wherein the processing unit is adapted to adjust a repetition rate and/or time offset of the respective heartbeat signals of the plurality of beacon units to not overlap with the heartbeat signals of the at least one neighboring radar system.

3. The radar system according to claim 2, wherein the respective heartbeat signals broadcasted by the plurality of beacon units enable the at least one neighboring radar system to adjust the heartbeat signals of the at least one neighboring radar system.

4. The radar system according to claim 1, wherein the radar system is used on a moving platform.

5. The radar system according to claim 1, wherein processing unit is electrically coupled to the receiving interface, the transmitting interface and each of the plurality of beacon units.

6. The radar system according to claim 2, wherein the processing unit is wirelessly coupled to the receiving interface, the transmitting interface and each of the plurality of beacon units.

7. The radar system according to claim 6, wherein the wireless coupling is performed on a different frequency or in a different frequency band than the heartbeat signal is broadcasted on.

8. The radar system according to claim 1, wherein providing position information of the radar system comprises broadcasting measurement and communication signals.

9. The radar system according to claim 2,
   wherein the processing unit is adapted to change at least one of a repetition rate or time offset of respective heartbeat signals to be transmitted by the plurality of beacon units, when it is determined that the specific portion of the predetermined time-frequency space is occupied, and
   wherein the plurality of beacon units is adapted to broadcast the respective heartbeat signals with the changed repetition rate or time offset.

10. The radar system according to claim 1, wherein the beacon units are arranged on a same level.

11. The radar system according to claim 1, wherein the transmitting interface and the receiving interface are combined in a transceiving interface.

12. The radar system according to claim 1,
   wherein the beacon units of the plurality of beacon units are arranged in a square manner on a same level, and
   wherein closest neighboring beacon units of the plurality of beacon units are apart from one another by at least 1 meter.

13. A method in a radar system for providing position information to a mobile unit, the method comprising:
   receiving, by a receiving interface, radio frequency (RF) signals;
   processing, by a processing unit, the received RF signals;
   determining, by the processing unit, an occupation of a predetermined time-frequency space by the received RF signals;

transmitting, by a transmitting interface, information on an intention of the radar system to occupy a specific portion of the predetermined time-frequency space;

providing, by a plurality of beacon units, position information of the radar system on the specific portion in the predetermined time-frequency space, when it is determined that the specific portion of the predetermined time-frequency space is not occupied, and transmitting, by the plurality of beacon units and on the specific portion in the predetermined time-frequency space, ranging signals based on which the mobile unit can compute its 3D position.

* * * * *